United States Patent
Jiang

(10) Patent No.: US 11,116,036 B2
(45) Date of Patent: Sep. 7, 2021

(54) DATA UNIT TRANSMISSION METHOD AND DEVICE BASED ON CONFIGURATION INSTRUCTION

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 154 days.

(21) Appl. No.: 16/564,616

(22) Filed: Sep. 9, 2019

(65) Prior Publication Data

US 2019/0394832 A1  Dec. 26, 2019

Related U.S. Application Data

(63) Continuation of application No. PCT/CN2017/081735, filed on Apr. 24, 2017.

(30) Foreign Application Priority Data

Mar. 14, 2017  (CN) .......................... 201710150400.4

(51) Int. Cl.
*H04W 80/02* (2009.01)
*H04W 28/06* (2009.01)
*H04W 80/08* (2009.01)

(52) U.S. Cl.
CPC ........... *H04W 80/02* (2013.01); *H04W 28/06* (2013.01); *H04W 80/08* (2013.01)

(58) Field of Classification Search
CPC ..... H04W 80/02; H04W 28/06; H04W 80/08; H04L 69/22; H04L 69/04
See application file for complete search history.

(56) References Cited

U.S. PATENT DOCUMENTS

2007/0019661 A1*  1/2007  Rowett .................. H04L 69/22
                                                              370/419
2008/0225847 A1*  9/2008  Manjunatha ............ H04L 47/32
                                                              370/389
2009/0034476 A1*  2/2009  Wang ................ H04W 36/0011
                                                              370/331

(Continued)

FOREIGN PATENT DOCUMENTS

CN         1913530 A      2/2007
CN       101043301 A      9/2007

(Continued)

OTHER PUBLICATIONS

International search report of PCT application No. PCT/CN2017/081735 dated Nov. 29, 2017.

(Continued)

*Primary Examiner* — Tejis Daya
(74) *Attorney, Agent, or Firm* — Syncoda LLC; Feng Ma

(57) ABSTRACT

A data unit transmission method includes: determining data to be transmitted by a PDU (Packet Data Unit) of a data bearer; and determining whether the data to be transmitted is an entire SDU (Service Data Unit) in an RLC (Radio Link Control) UM (Unacknowledged Mode) or a data segment of the SDU in the RLC UM; if the data is a data segment of the SDU, obtaining a PDU of the data bearer and adding a SN (Serial Number) field, indicating that the data correspond to a header of the PDU.

13 Claims, 8 Drawing Sheets

--- a configuration instruction for a data bearer is received from a base station /101

↓ after receiving the configuration instruction, no SN (Serial Number) field is added PDU header of the data bearer if the PDU includes an entire SDU in an RLC (Radio Link Control) UM (unacknowledged mode), and an SN (Serial Number) field is added to a PDU (Packet Data Units) header of the data bearer if the PDU includes a data segment of the SDU in an RLC UM /102

(56) References Cited

U.S. PATENT DOCUMENTS

| | | | |
|---|---|---|---|
| 2009/0086759 A1* | 4/2009 | Heise | H04L 1/1887 370/474 |
| 2010/0202613 A1* | 8/2010 | Ray | H04W 12/033 380/270 |
| 2012/0250631 A1* | 10/2012 | Hakola | H04L 5/0094 370/329 |
| 2012/0294281 A1 | 11/2012 | Park et al. | |
| 2013/0170496 A1 | 7/2013 | Kim et al. | |
| 2013/0259036 A1* | 10/2013 | Tamir | H04L 45/72 370/389 |
| 2017/0118671 A1* | 4/2017 | Lee | H04W 72/14 |
| 2018/0041413 A1* | 2/2018 | Yi | H04W 12/80 |
| 2019/0028920 A1* | 1/2019 | Pan | H04W 76/12 |
| 2019/0297530 A1* | 9/2019 | Ohta | H04L 47/32 |

FOREIGN PATENT DOCUMENTS

| | | |
|---|---|---|
| CN | 101478380 A | 7/2009 |
| CN | 101867972 A | 10/2010 |
| CN | 101925195 A | 12/2010 |
| CN | 102577214 A | 7/2012 |
| CN | 102647332 A | 8/2012 |
| CN | 105532059 A | 4/2016 |
| EP | 1168759 A2 | 1/2002 |
| WO | WO-2006118435 A1 * | 11/2006 ......... H04L 41/0213 |

OTHER PUBLICATIONS

First office action of Chinese application No. 201780000252.6 dated Nov. 22, 2019.
3GPP TS36.322.

* cited by examiner

US 11,116,036 B2

DATA UNIT TRANSMISSION METHOD AND DEVICE BASED ON CONFIGURATION INSTRUCTION

This application is a continuation of International Application No. PCT/CN2017/081735 filed on Apr. 24, 2017, which claims priority to Chinese Patent Application No. 201710150400.4 filed on Mar. 14, 2017. The disclosures of these applications are incorporated herein by reference in their entirety.

BACKGROUND

With the rapid development of wireless communication technologies, LTE (Long Term Evolution), which is a long-term evolution of the UMTS (Universal Mobile Telecommunications System) technology standard formulated by the 3GPP ($3^{rd}$ Generation Partnership Project) organization, has emerged. An RLC (Radio Link Control) layer which supports an AM (acknowledged mode) and an UM (unacknowledged mode) exists in LTE.

SUMMARY

The present disclosure relates to the field of wireless communication technology, and more specifically to a data unit transmission method and device.

Various embodiments of the present disclosure provide a data unit transmission method and device.

According to a first aspect of the present disclosure, there is provided a data unit transmission method, including:
determining data to be transmitted by a PDU (Packet Data Unit) of a data bearer; and
determining that whether the data to be transmitted is an entire SDU (Service Data Unit) in an RLC (Radio Link Control) UM (Unacknowledged Mode) or a data segment of the SDU in the RLC UM; if the data is a data segment of the SDU, obtaining a PDU (Packet Data Unit) of the data bearer with adding a SN (Serial Number) field, indicating the SDU that the data corresponding, to a header of the PDU.

In some embodiments, the method includes:
receiving a configuration instruction for a data bearer from a base station; and
after receiving the configuration instruction, obtaining a PDU of data bearer without adding a SN (Serial Number) field to a header of the PDU if the PDU comprises an entire SDU (Service Data Unit) in an RLC (Radio Link Control) UM (Unacknowledged Mode), or obtaining a PDU of data bearer with adding a SN (Serial Number) field to a header of the PDU if the PDU includes a data segment of an entire SDU in an RLC UM.

In some embodiments, the configuration instruction is configured to instruct to turn off an ROHC (Robust Header Compression) function of a data bearer adopting the RLC UM.

In some embodiments, the configuration instruction is configured to instruct to turn off a duplicate detection function of a data bearer adopting the RLC UM.

In some embodiments, the method includes:
obtaining a PDU of data bearer without adding a SN field to a header of the PDU, if the PDU is transmitted through a PDCP (Packet Data Convergence Protocol) layer in a specific mode.

According to a second aspect of the present disclosure, there is provided a data unit transmission method, including:

obtaining a specific filed of a PDU (Packet Data Unit), wherein the specific field is configured to indicate whether the PDU comprises a data segment of an SDU (Service Data Unit);
if the specific filed indicates that the PDU comprises an entire SDU, obtaining the SDU from the PDU; and
if the specific filed indicates that the PDU comprises a data segment of the SDU, continuously receiving PDUs until all the PDUs with the same SN (Serial Number) filed are received; and reordering all the PDUs with the same SN field to obtain an entire SDU.

In some embodiments, the method further includes:
acquiring, by an RLC layer, a specific field of a PDU, wherein the specific field is configured to indicate whether the PDU comprises a data segment;
extracting, by the RLC layer, an SDU from the PDU if the specific field has a first value, wherein the first value is configured to indicate that the PDU comprises an entire SDU; or
continuously receiving, by the RLC layer, a following PDU according an SN field of a PDU if the specific field has a second value; then performing a reordering when all the PDUs with the same SN field are received, and extracting an SDU from the recorded PDUs, wherein the second value is configured to indicate that the PDU comprises a data segment of the SDU.

In some embodiments, the continuously receiving a following PDU according an SN field of a PDU includes:
storing, by the RLC layer, the PDUs in a cache;
setting, by the RLC layer, one timer that corresponds to the SN field for the SN field and starting the timer; and
continuously receiving, by the RLC layer, a PDU with the same SN field, and storing all the PDUs in the cache.

In some embodiments, the method further includes:
deleting, by the RLC layer, all the PDUs with the same SN field if a timing period of the timer exceeds a preset time period; and
when all the PDUs with the same SN field are received within a timing period shorter than the preset time period, stopping, by the RLC layer, the timer corresponding to the SN field.

In some embodiments, the method further includes:
obtaining, by the RLC layer, a sequential identifier of each received PDU, wherein the sequential identifier is configured to indicate a sequential position of a data segment in the SDU; and
when the sequential identifier indicates that a data segment of the SDU comprised by a PDU is a last segment in the SDU, determining, by the RLC layer, that all the PDUs with the same SN field are received.

In some embodiments, wherein the performing a reordering when all the PDUs with the same SN field are received includes:
performing, by the RLC layer, a reordering on all the PDUs based on a sequential identifier of each received PDU when all the PDUs with the same SN field are received.

In a third aspect of the present disclosure, there is provided a data unit transmission device, including:
a receiving module configured to a configuration instruction for a data bearer from a base station; and
a processing module configured to, after receiving the configuration instruction, obtain a PDU of data bearer without adding a SN (Serial Number) field to a header of the PDU if the PDU comprises an entire SDU (Service Data Unit) in an RLC (Radio Link Control) UM (Unacknowledged Mode), or obtain a PDU of data bearer with adding a SN (Serial Number) field to a header of the PDU if the PDU comprises a data segment of an entire SDU in an RLC UM.

In some embodiments, the configuration instruction is configured to instruct to turn off an ROHC (Robust Header Compression) function of a data bearer adopting the RLC UM.

In some embodiments, the configuration instruction is configured to instruct to turn off a duplicate detection function of a data bearer adopting the RLC UM.

In some embodiments, the device further includes:
a transmission module configured to obtain a PDU of data bearer without adding a SN field to a header of the PDU, if the PDU is transmitted through a PDCP (Packet Data Convergence Protocol) layer in a specific mode.

In a fourth aspect of the present disclosure, there is provided a data unit transmission device, including:
an acquiring module configured to acquire, by an RLC layer, a specific field of a PDU, wherein the specific field is configured to indicate whether the PDU comprises a data segment;
an extracting module configured to extract, by the RLC layer, an SDU from the PDU if the specific field has a first value, wherein the first value is configured to indicate that the PDU comprises an entire SDU;
a receiving module configured to continuously receive a following PDU according an SN field of a PDU if the specific field has a second value, wherein the second value is configured to indicate that the PDU comprises a data segment of the SDU;
a processing module configured to perform a reordering when all the PDUs with the same SN field are received; and
an extracting module configured to extract an SDU from the recorded PDUs.

In some embodiments, the receiving module includes:
a memory sub-module configured to store, by the RLC layer, the PDUs in a cache;
a timing sub-module configured to set, by the RLC layer, one timer that corresponds to the SN field for the SN field and starting the timer; and
a receiving sub-module configured to receive, by the RLC layer, a PDU with the same SN field, wherein the memory sub-module is configured to store the received PDUs in the cache.

In some embodiments, the receiving module further includes:
a deleting sub-module configured to delete, by the RLC layer, all the PDUs with the same SN field if a timing period of the timer exceeds a preset time period; and
a stopping sub-module configured to stop, by the RLC layer, the timer corresponding to the SN field, when all the PDUs with the same SN field are received within a timing period shorter than the preset time period.

In some embodiments, the device further includes:
a reading module configured to obtain, by the RLC layer, a sequential identifier of each received PDU, wherein the sequential identifier is configured to indicate a sequential position of a data segment in the SDU; and
a determining module configured to determine, by the RLC layer, that all the PDUs with the same SN field are received, when the sequential identifier indicates that a data segment of the SDU comprised by a PDU is a last segment in the SDU.

In some embodiments, the processing module is further configured to perform, by the RLC layer, a reordering on all the PDUs based on a sequential identifier of each received PDU when all the PDUs with the same SN field are received.

In a fifth aspect of the present disclosure, there is provided a data unit transmission device, including:
a processor; and
a memory configured to store an executable instruction of the processor, wherein
the processor is configured to:
determine data to be transmitted by a PDU (Packet Data Unit) of a data bearer; and
determine that whether the data to be transmitted is an entire SDU (Service Data Unit) in an RLC (Radio Link Control) UM (Unacknowledged Mode) or a data segment of the SDU in the RLC UM; if the data is a data segment of the SDU, obtaining a PDU of a data bearer with adding a SN (Serial Number) field, indicating the SDU that the data corresponding, to a header of the PDU.

In some embodiments, the processor is configured to:
receive a configuration instruction for a data bearer from a base station; and
after receiving the configuration instruction, obtain a PDU of data bearer without adding a SN (Serial Number) field to a header of the PDU if the PDU comprises an entire SDU (Service Data Unit) in an RLC (Radio Link Control) UM (Unacknowledged Mode), or obtain a PDU of data bearer with adding a SN (Serial Number) field to a header of the PDU if the PDU comprises a data segment of an entire SDU in an RLC UM.

In a sixth aspect of the present disclosure, there is provided a data unit transmission device, including:
a processor; and
a memory configured to store an executable instruction of the processor, wherein
the processor is configured to:
acquire, by an RLC layer, a specific field of a PDU, wherein the specific field is configured to indicate whether the PDU comprises a data segment;
extract, by the RLC layer, an SDU from the PDU if the specific field has a first value, wherein the first value is configured to indicate that the PDU comprises a entire SDU; or
continuously receive, by the RLC layer, a following PDU according an SN field of a PDU if the specific field has a second value; then perform a reordering when all the PDUs with the same SN field are received, and extracting an SDU from the recorded PDUs, wherein the second value is configured to indicate that the PDU comprises a data segment of the SDU.

It is to be understood that both the foregoing general description and the following detailed description are exemplary only and are not restrictive of the present disclosure.

BRIEF DESCRIPTION OF THE DRAWINGS

The drawings herein are incorporated into the specification and constitute a part of the present specification, illustrate embodiments consistent with the present disclosure and are used to explain principles of the present disclosure in combination with the specification.

DETAILED DESCRIPTION

Figure 1:
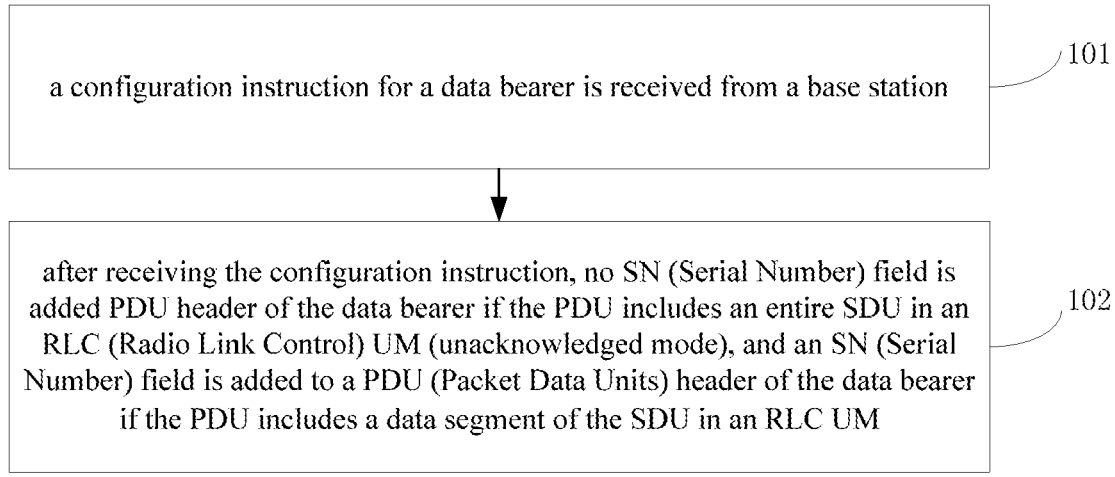
FIG. 1 illustrates a flow diagram of a data unit transmission method according to some embodiments of the present disclosure.

Reference will now be made in detail to various embodiments, examples of which are illustrated in the accompanying drawings. The following description refers to the accompanying drawings in which the same numbers in different drawings represent the same or similar elements unless otherwise represented. The implementations set forth in the following description of examples do not represent all implementations consistent with the present disclosure. Instead, they are merely examples of devices and methods consistent with aspects related to the disclosure as recited in the appended claims.

The terminology used herein is for the purpose of describing particular examples only and is not intended to be limiting of examples. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two functions or acts shown in succession may in fact be executed concurrently or may sometimes be executed in the reverse order, depending upon the functionality/acts involved.

To prevent losing or receiving redundantly a PDU (Packet Data Unit), an unacknowledged mode of RLC supports cascading and segmentation of the PDUs. However, currently, the 3GPP organization has basically removed the cascading function of the RLC, which means that in the unacknowledged mode, the PDUs of the RLC layer will not be cascaded. Therefore, in order to prevent the PDUs from loss and duplication, a transmitter adds in a SN (Serial Number) field in each PDU.

Typically, in the unacknowledged mode, a receiver determines whether a PDU is lost or received repeatedly by maintaining a reordering window. The maximum number of PDUs that can be reordered is determined by a size of the reordering window (UM_Window_Size) of the RLC receiver. In order to facilitate translation of the window, when the received PDUs are out of order, a reordering timer is started to record the time required for receiving the lost PDUs. When the time recorded by the reordering timer exceeds preset time, a lower bound (VR (UR)) of the reordering window is moved to a SN next to a SN the reordering timer of the PDUs is triggered, and an upper bound (VR (UH)) of the reordering window is obtained by adding 1 to a SN, corresponding to a largest SN among the PDUs received. In this way, when VR(UR)<VR(UH)-UM_Window_Size, then VR(UR)=VR(UH)-UM_Window_Size. When the reordering window moves, the PDU that should fall into the reordering window may fall onto the left side of the moved reordering window. Thus, the receiver extracts an SDU (Service Data Unit) from these PDUs and submits it to a PDCP (Packet Data Convergence Protocol).

The inventors of the present disclosure have recognized the following problems in typical systems.

For a PDU that includes an entire SDU, the SN is still added in the PDU. As a result, after receiving the PDU that includes the entire SDU, the receiver still detects the SN of the PDU. Thus, the calculation costs are large with low efficiency.

FIG. 1 illustrates a flow diagram of a data unit transmission method according to some embodiments of the present disclosure. As shown in FIG. 1, the data unit transmission method includes the following steps.

In step 101, a configuration instruction for a data bearer is received from a base station.

In step 102, after receiving the configuration instruction, no SN (Serial Number) field is added PDU header of the data bearer if the PDU includes an entire SDU in an RLC (Radio Link Control), UM (unacknowledged mode), and an SN (Serial Number) field is added to a PDU (Packet Data Units) header of the data bearer if the PDU includes a data segment of the SDU in an RLC UM.

In some embodiments, the configuration instruction is configured to instruct that a ROHC (Robust Header Compression) of the data bearer in the RLC UM is turned off.

In yet another example, the configuration instruction is configured to indicate that a duplicate detection of the data bearer in the RLC UM is turned off.

In yet another example, the data unit transmission method further includes the following step:

in a specific mode, no SN filed is added to an SDU which is transmitted through a PDCP layer.

According to the data unit transmission method provided by some embodiments of the present disclosure, the configuration instruction for the data bearer transmitted by the base station is received, such that the SN filed is added to a PDU that includes the SDU segment, or no SN filed is added to a PDU that includes entire SDU. Thus, the calculation cost is reduced, and efficiency is improved.

In yet another example, a sequential identifier is added to each data segment according to a sequential position of the data segment in the SDU, such that a receiver may subsequently perform an ordering on the data segments according to the sequential identifier. Thus, the loss of data fragments of the SDU is avoided, and the integrity of the SDU is guaranteed.

In yet another example, the SDU may be transmitted through a PDCP layer without adding an SN field, such that the processing efficiency is improved.

All of the above optional technical solutions may form optional examples of the present disclosure in arbitrary combinations thereof, and detailed description thereof will not be presented herein.

Figure 2:
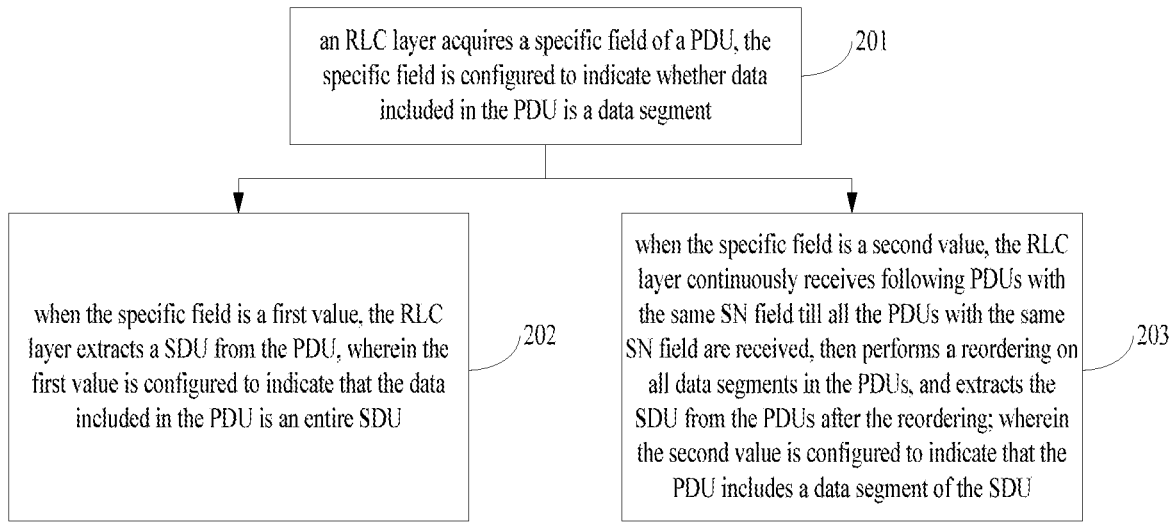
FIG. 2 illustrates a flow diagram of a data unit transmission method according to some embodiments of the present disclosure.

FIG. 2 illustrates a flow diagram of a data unit transmission method according to some embodiments. As shown in FIG. 2, the data unit transmission method includes the following steps.

In step 201, an RLC layer acquires a specific field of a PDU, the specific field is configured to indicate whether data included in the PDU is a data segment.

In step 202, when the specific field is a first value, the RLC layer extracts an SDU from the PDU, wherein the first value is configured to indicate that the data included in the PDU is an entire SDU.

In step 203, when the specific field is a second value, the RLC layer continuously receives following PDUs with the same SN field till all the PDUs with the same SN field are received, then performs a reordering on all data segments in the PDUs, and extracts the SDU from the PDUs after the reordering; wherein the second value is configured to indicate that the PDU includes a data segment of the SDU.

In some embodiments, wherein the RLC layer continuously receives following PDUs with the same SN field, includes:

the RLC layer receives a PDU, and stores the PDU in a cache;

the RLC layer sets one timer that corresponds to the SN field of the PDU, and starts the timer; and the RLC layer continuously receives the following PDUs with the same SN filed, and stores the following PDUs in the cache.

In yet another example, the data unit transmission method further includes:

the RLC layer fails to receive all the PDUs with the same SN filed within a timing period that exceeds a preset time period of the timer, the RLC layer deletes all the PDUs with the same SN filed; and if all the PDUs with the same SN field are received within a timing period that is shorter than a preset time period of the timer, the RLC layer stopes the timer corresponding to the SN field.

In yet another example, the data unit transmission method further includes:

when the RLC layer receives a PDU, the RLC layer obtains a sequential identifier of the PDU, wherein the sequential identifier is configured to indicate a sequential position of a data segment, which is included in the PDU, in the SDU; and when the sequential identifier indicates that a received data segment of the SDU included in the PDU is a last data segment of the SDU, the RLC layer determines that all the PDUs with the same SN field are currently received.

In yet another example, wherein the performs a reordering on all data segments in the PDUs till all the PDUs with the same SN field are received, includes:

The RLC layer performs a reordering on all the PDUs based on the sequential identifier of the each received PDU.

In the data unit transmission method provided by some embodiments of the present disclosure, the value of the specific field of a PDU that is set to be the first value indicates that the current PDU includes an entire SDU; or the value of the specific field of a PDU that is set to be the second value indicates that the current PDU includes a data segment of the SDU. No SN field is added to a PDU that includes an entire SDU, and the SN field is added to a PDU that includes a data segment of the SDU. Thus, a reordering may be performed only on the PDUs that include a data segment with the same SN field, and no reordering is performed to the PDU that includes an entire SDU. Hence, time delays in receiving and processing the PDU are reduced. The processing efficiency is improved accordingly.

In yet another example, during the process of receiving the PDU which includes a data segment of an entire SDU, the data segment included in the PDU is stored in a cache so as to wait for receiving all the SDU data segments. Thus, the SDU data segment included in the PDU is prevented from loss.

In yet another example, a corresponding timer is set for each first SN field to record time required for receiving all the PDUs with the same first SN field, and then determine whether the time is expired. If yes, the received PDUs with the same SN filed are deleted, and the receiving process is performed again. If not, a continuous waiting is performed. Thus, the processing efficiency is improved while the SDU data segment included in the PDU is prevented from loss.

In yet another example, upon receiving a PDU, whether all the PDUs with the same first SN field are received is determined by the sequential identifier of the PDU. Thus, the PDU is prevented from loss.

In yet another example, a reordering process is performed on all the PDUs based on the sequential identifier of each received PDU. Thus, the SDU obtained after the reordering is completely consistent with the SDU transmitted by the transmitter. Accordingly, the integrity of the SDU is guaranteed.

Figure 3A:
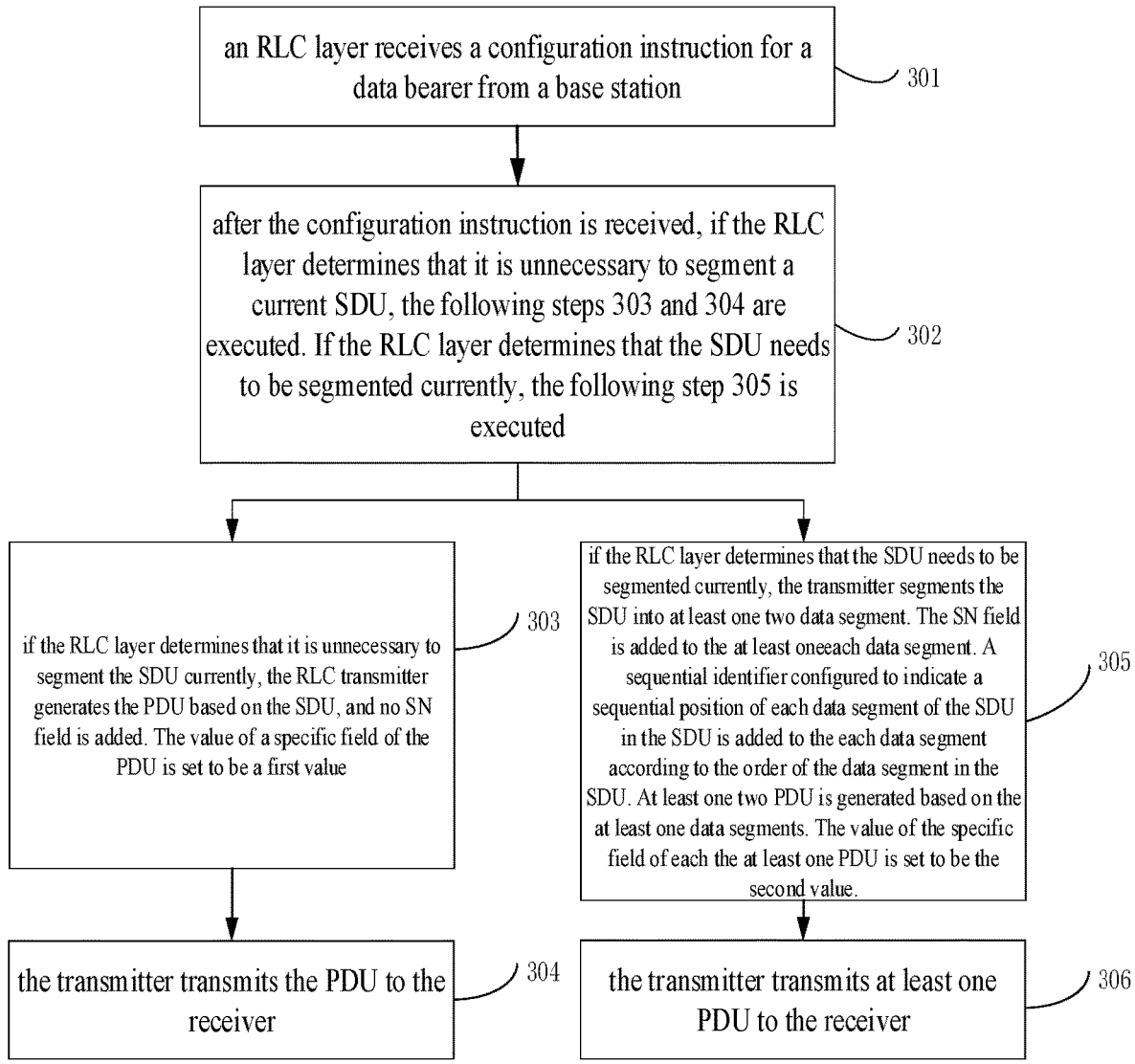
FIG. 3A illustrates a flow diagram of a data unit transmission method according to some embodiments of the present disclosure.

FIG. 3A is a flow diagram showing a data unit transmission method according to some embodiments of the present disclosure. As shown in FIG. 3A, the method is applied to an RLC layer which is set to a specific mode. In the specific mode, during each time of data transmission, it is unnecessary for a receiver to feedback an ACK (Acknowledge) to a transmitter. The specific mode may be an unacknowledged mode (UM). The data unit transmission method includes the following steps.

In step 301, an RLC layer receives a configuration instruction for a data bearer from a base station.

In some embodiments of the present disclosure, in order to enable the RLC layer to selectively add a SN field, the base station may transmit the configuration instruction for the data bearer to the RLC layer, such that the RLC layer determines according to the configuration instruction whether a corresponding function needs to be turned on to enable the addition of the SN field. The corresponding function may be an ROHC function or a duplicate detection function.

When the RLC layer receives a configuration instruction for a certain data bearer from the base station, the configuration instruction is configured to indicate turning on the corresponding function, for example, the ROHC function or the duplicate detection function, which can enable the addition of the SN field. Both of the ROHC function and the duplicate detection function can control that no SN field is added to a PDU.

In step 302, after the configuration instruction is received, if the RLC layer determines that it is unnecessary to segment a current SDU, the following steps 303 and 304 are executed. If the RLC layer determines that the SDU needs to be segmented currently, the following step 305 is executed.

Figure 3B:
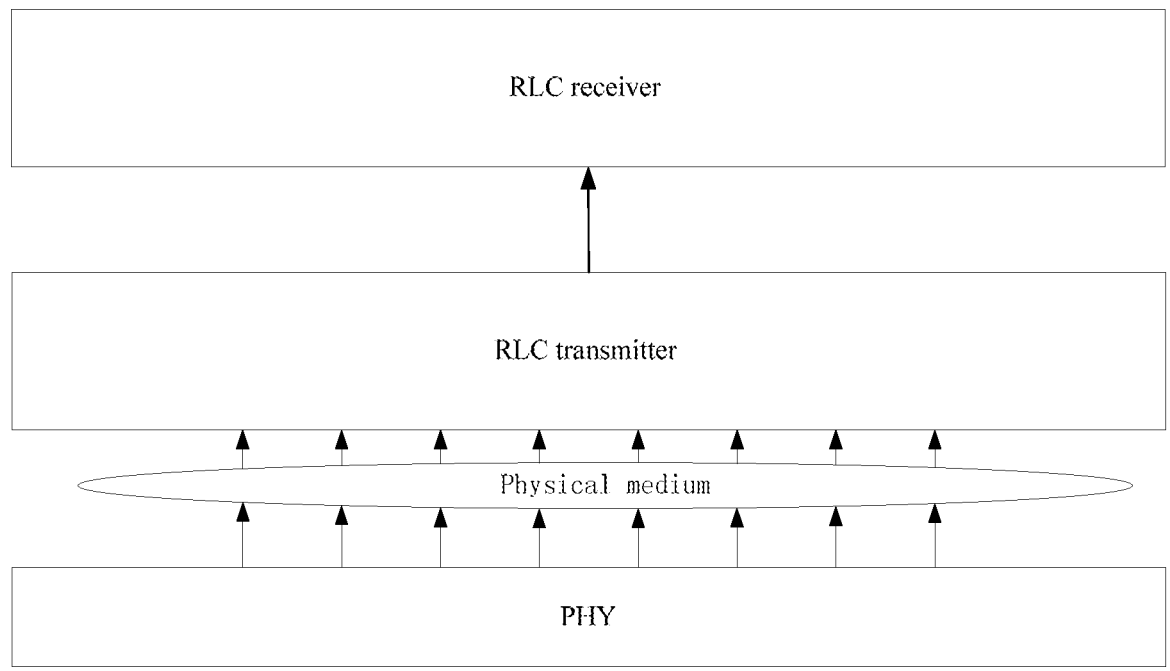
FIG. 3B illustrates a schematic diagram of a data unit transmission method according to some embodiments of the present disclosure.

In some embodiments of the present disclosure, referring to FIG. 3B, a protocol stack portion of LTE is divided into MAC (Media Access Control), RLC and PDCP. The MAC layer is the lowest layer and defines how to transmit a data unit on a medium; the MAC layer is mainly in charge of controlling and connecting physical mediums corresponding to physical layer of LTE. RLC is located on top of the MAC layer and provides segmentation and transmission services for the data unit; the RLC includes a transmitter and a receiver. PDCP is located on top of the RLC and is configured to guarantee the security in transmitting the data unit of the protocol stack portion of LTE.

The SDU is a service data unit needs to be transmitted from a transmitter of the RLC layer of the current device to receivers of RLC layers of other devices, and is generally transmitted by a PDU. Thus, in consideration that the service efficiency is adversely affected by the size of the PDU and a high load that may be caused during data transmission, the RLC layer may determine whether the SDU needs to be transmitted in a data segmented manner before transmitting the SDU so as to conveniently improve the service efficiency. When determining whether the SDU needs to be transmitted in a data segmented manner, the RLC layer may receive, from the MAC layer, the size of an SDU which could be transmitted before the RLC layer performs data transmission, and then determines whether the SDU needs to be segmented according to the size of an SDU transmitted by the RLC layer. For example, if the MAC layer indicates that the size of an SDU that could be transmitted by the RLC layer is 1 KB, and the size of current SDU to be transmitted by the RLC layer is 1 KB, it is unnecessary to segment the SDU to be transmitted. If the MAC layer indicates that the size of an SDU that could be transmitted by the RLC layer is 1 KB, and the size of the SDU to be transmitted is 3 KB, the SDU needs to be segmented.

In step 303, if the RLC layer determines that it is unnecessary to segment the SDU currently, the RLC transmitter generates the PDU based on the SDU, and no SN field is added. The value of a specific field of the PDU is set to be a first value.

In some embodiments of the present disclosure, the SN field is configured to indicate that at least two data segments with the same SN field are obtained by segmenting an SDU. Since the RLC layer determines that it is unnecessary to segment the SDU currently, after the PDU is generated based on the SDU, it is unnecessary to add a SN field into the PDU. The specific field is a fixed field in header of a PDU, the name of the field may be FI or SI, and the size of the field may be 1 byte. The specific field is configured to indicate whether the PDU includes an entire SDU or a data segment of an entire SDU. During value setting for the specific field of the PDU, if the RLC layer determines that the SDU does not need to be segmented currently, it indicates that the SDU may be carried by one PDU. Thus, the PDU may be generated based on the SDU. The fixed field in the PDU packet header is set to be the first value, such that when receiving the PDU, the RLC receiver may subsequently determine according to the fixed field set to be the first value that the PDU includes the entire SDU, and it is unnecessary to perform recording on the PDU. If the RLC layer determines that the SDU needs to be segmented currently, the RLC layer obtains at least one data segment of the SDU after segmenting the SDU. Based on that a plurality of PDU carries at least one the data segment of the SDU, the PDU can be generated based on the SDU.

The fixed field in the header of the PDU is set to be a second value, such that when receiving the PDU, the receiver may subsequently determine according to the fixed field set to be the second value that the PDU includes a data segment of the SDU.

In order to distinguish the PDU that includes the entire SDU from the PDU that includes the data segment of the SDU, the first value and the second value may be different from each other. The first value may be set to be 0 while the second value may be set to be 1. It should be noted that in the following descriptions of some embodiments of the present disclosure, that the first value is set to be 0 and the second value is set to be 1 is taken as an example.

In step 304, the transmitter transmits the PDU to the receiver.

In some embodiments of the present disclosure, the transmitter and the receiver of RLC need to support the same transport protocol. The transmitter can directly transmit the PDU to the receiver based on the transport protocol supported by the transmitter and the receiver.

In step 305, if the RLC layer determines that the SDU needs to be segmented currently, the transmitter segments the SDU into at least two data segments. The SN field is added to each data segment. A sequential identifier configured to indicate a sequential position of each data segment of the SDU in the SDU is added to each data segment according to the order of the data segment in the SDU. At least two PDU is generated based on the data segments. The value of the specific field of each PDU is set to be the second value.

In some embodiments of the present disclosure, each SN field corresponds to one entire SDU only. The sequential identifier is configured to indicate the sequential position of a data segment in the SDU. Each data segment obtained by segmenting the SDU corresponds to one sequential identifier, such that the data segments can be subsequently ordered according to the sequential identifier of each data segment. Thus, the SDU is obtained through restoration. The data segments are prevented from loss.

When the RLC layer determines that the current SDU needs to be segmented, the SDU can be segmented according to the size of an SDU could be transmitted by the RLC layer. That is, the SDU is segmented into data segments of which the size is equal to the size of an SDU that could be transmitted by the RLC layer. For example, when the size of an SDU to be transmitted is 3 KB, and the size of the SDU that could be transmitted by the RLC layer is 1 KB, the SDU to be transmitted may be segmented into three data segments.

If an SDU that cannot be segmented evenly, the SDU may be segmented according to the size of the SDU that could be transmitted by the RLC layer first. After that, a default value or a blank byte is filled to a remaining segment of which the size is smaller than the size of the SDU that could be transmitted by the RLC layer, so as to ensure that the size of the remaining data filled by the default value or the blank byte is consistent with the size of the SDU that could be transmitted by the RLC layer. The remaining data segment filled by the default value or the blank byte is transmitted by a PDU as an independent data segment. For example, when the size of an SDU to be transmitted is 7 KB, and the size of the SDU that could be transmitted by the RLC layer is 2 KB, the SDU to be transmitted can be segmented into three data segments first. Then, a blank byte with a size of 1 KB is added to the remaining data segment with a size of 1 KB. The remaining data added with the blank byte may be also considered as an independent data segment. That is, the SDU to be transmitted is segmented into four data segments.

In step 306, the transmitter transmits at least one PDU to the receiver.

In some embodiments of the present disclosure, the transmitter ca sequentially transmits all PDUs to the receiver based on the transport protocol supported by the transmitter and the receiver according to the sequential identifier of the SDU included in the PDU.

The contents described in the above steps 301 to 306 are a process that the RLC layer determines whether the SDU needs to be segmented; if the RLC determines that it is unnecessary to segment the SDU currently, the transmitter generates the PDU based on the SDU without adding the SN field, and the value of the specific field of the PDU is set to be the first value, then the PDU is transmitted to the receiver; and if the RLC layer determines that the current SDU needs to be segmented, the transmitter segments the SDU into at least two data segments, and the SN field is added to each data segment; and at least two PDU is generated based on the data segments, the value of the specific field of each PDU is set to be the second value, and the PDUs are transmitted to the receiver.

The above steps 301 to 306 are the specific process that after the configuration instruction is received, no SN field is added into the PDU header if the PDU includes an entire SDU in an RLC (Radio Link Control) UM (unacknowledged mode). In manner that a SN field is added into the PDU header if the PDU includes a data segment of the SDU in an RLC UM, the manner could be implemented by turning of the ROHC function or the duplicate detection function. The specific manner will not be limited by examples of the present disclosure.

According to the data unit transmission method provided by examples of the present disclosure, the configuration instruction for the data bearer, transmitted by the base station, is received, such that the SN field is added into the PDU that includes a data segment of the SDU, and no SN field is added into the PDU that includes the entire SDU. Thus, the calculation amount is reduced. The processing efficiency is improved.

Figure 3C:
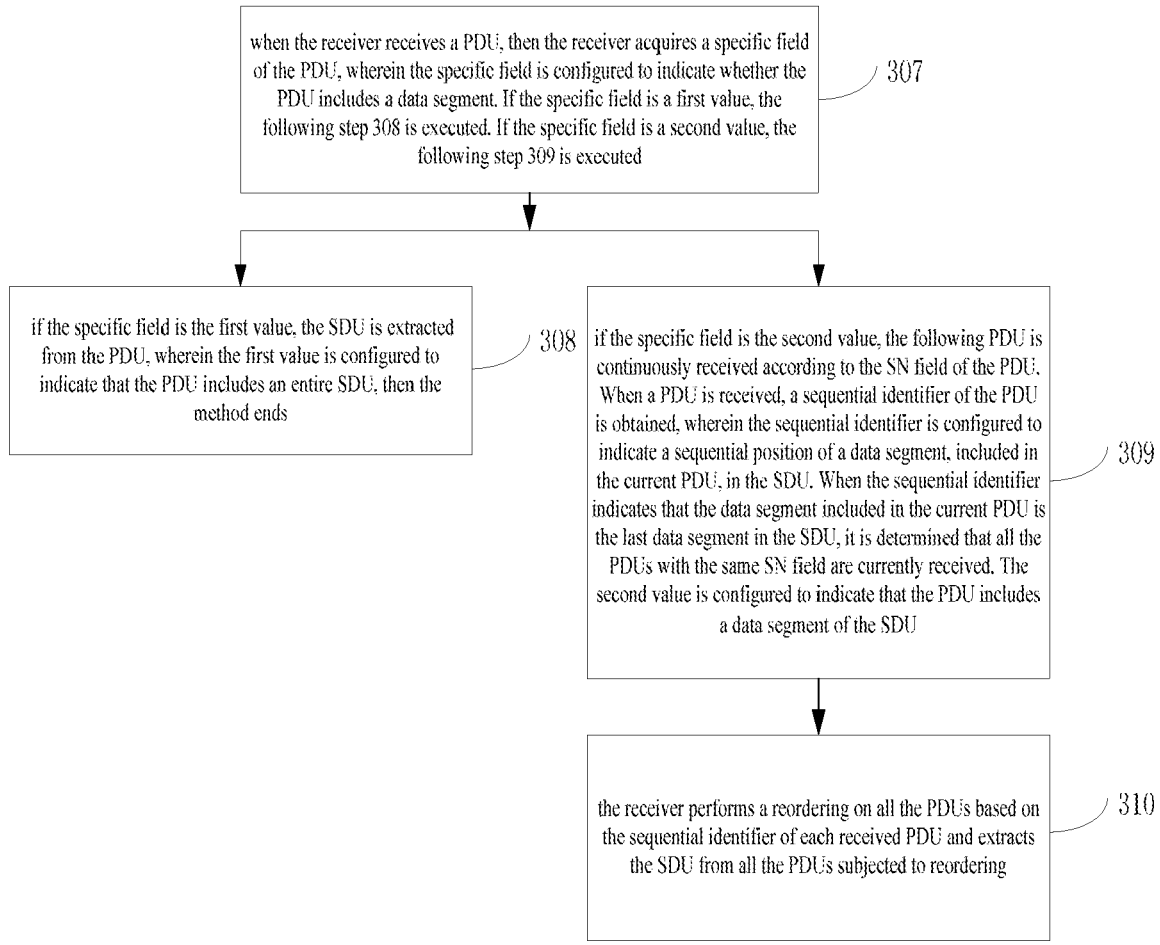
FIG. 3C illustrates a flow diagram of a data unit transmission method according to some embodiments of the present disclosure.

FIG. 3C is a flow diagram showing a data unit transmission method according to some embodiments of the present disclosure. The examples of the data unit transmission method may be applied to a receiver. As shown in FIG. 3C, the data unit transmission method includes the following steps.

In step 307, when the receiver receives a PDU, then the receiver acquires a specific field of the PDU, wherein the specific field is configured to indicate whether the PDU includes a data segment. If the specific field is a first value, the following step 308 is executed. If the specific field is a second value, the following step 309 is executed.

In some embodiments of the present disclosure, inventors realize that the reordering is not necessary for the PDU that includes an entire SDU, such that time spent in processing the PDU is saved. Thus, in order to improve the service efficiency, when the receiver receives a PDU, the receiver may acquire the specific field of a PDU header to obtain a value of the specific field, and then determines whether the reordering is necessary according to the value of the specific field.

For the PDU of which the specific field is the first value (for example, 0), namely, the PDU includes the entire SDU, then the reordering may be not necessary. That is, the following step 308 is executed. For the PDU of which the specific field is the second value (for example, 1), namely, the PDU includes a data segment of the SDU, then the reordering may be necessary. That is, the following step 309 is executed.

In step 308, if the specific field is the first value, the SDU is extracted from the PDU, wherein the first value is configured to indicate that the PDU includes an entire SDU, then the method ends.

In some embodiments of the present disclosure, the first value (for example, 0) is configured to indicate that the PDU includes the entire SDU. In this way, the receiver can directly extract the SDU from the PDU without executing the reordering. Thus, the processing efficiency is improved.

In step 309, if the specific field is the second value, the following PDU is continuously received according to the SN field of the PDU. When a PDU is received, a sequential identifier of the PDU is obtained, wherein the sequential identifier is configured to indicate a sequential position of a data segment, included in the current PDU, in the SDU. When the sequential identifier indicates that the data segment included in the current PDU is the last data segment in the SDU, it is determined that all the PDUs with the same SN field are currently received. The second value is configured to indicate that the PDU includes a data segment of the SDU.

In some embodiments of the present disclosure, the second value (for example, 1) is configured to indicate that the PDU includes a data segment of the SDU. Since each PDU is transmitted according to the sequential identifier, the receiver could not receive all the PDUs simultaneously, and needs to wait for receiving other PDUs. In this way, when a PDU is received, the data segment in the PDU may be extracted and stored in a cache so as to wait for receiving other data segments of the SDU to constitute the entire SDU. The cache may be a receiving buffer or a specific cache on the receiver.

When a data segment in a first PDU is stored in the cache, in order to guarantee normal proceeding of services and the service efficiency, an SN field in the data segment can be obtained. One timer that corresponds to the SN field is set. The timer is started for timing. Other PDUs with the same SN field are continuously received. The other PDUs are stored in the cache.

If a PDU with a different SN field is received in the process of waiting for receiving a PDU with the same SN field, another timer corresponding to the different SN field may be set. The data segment in the PDU with the different SN field is stored in other caches or stored in the same cache. The data segments of different SDUs may be identified by the SN field. It should be noted that each SN field corresponds to a unique timer; and when a timer is started, it will not be updated midway, or will not be restarted.

A preset time period is determined for a timer. In the process of waiting for receiving of other PDUs, there may be a case that the timing period of the timer exceeds the preset time period, and another case that all other PDUs are received within the preset time period. The above two cases may be correspondingly handled.

Case 1: If the timing period of the timer exceeds the preset time period, the receiver deletes the PDU and the other PDUs.

In some embodiments of the present disclosure, when the timing period of the timer exceeds the preset time period, in order to guarantee the service efficiency and to avoid taking much time, the timer is stopped. Meanwhile, the receiver stops continuously receiving other PDUs of which the SN fields are the same as the SN field of the current PDU. To avoid the case that the first received PDU of which the SN field is the same as said SN field of the current PDU and the re-transmitted PDU of which the SN field is the same as the SN field of the current PDU have a duplicate packet when all the PDUs of which the SN fields are the same as said SN field of the current PDU are subsequently requested for the receiver and to guarantee the integrity of the SDU received by the receiver, the receiver may delete all of the currently received PDUs with the SN filed. After deletion, a request instruction is generated based on the SN field of the current PDU and is transmitted to the transmitter, such that after receiving the request instruction, the transmitter re-transmits all the PDUs of which the SN fields are the same as said SN field of the current PDU. The receiver receives the PDUs again and starts the timer.

Case 2: When all the PDUs of which SN field is the same as the SN field of the current PDU are received, the receiver stops the timer corresponding to the SN field if the timing period of the timer is shorter than the preset time period.

In some embodiments of the present disclosure, when the receiver receives a PDU, a sequential identifier of the SDU included in the PDU is obtained. The sequential identifier is configured to indicate a sequential position of a data segment, which is included in the current PDU, in the SDU. When the sequential identifier indicates that the data segment included by the current PDU is the last data segment in the SDU, the receiver determines that all the PDUs of which the SN fields are the same as the SN field of the current PDU are currently received.

When all the PDUs of which the SN fields are the same as the SN field of the current PDU are received, it indicates that all data segments that constitute the same SDU have been received and no data segment gets lost. Thus, timing of the timer may be stopped, such that the timer can conveniently perform timing on the next SDU that is segmented into a plurality of data segments.

In step 310, the receiver performs a reordering on all the PDUs based on the sequential identifier of each received PDU and extracts the SDU from all the PDUs subjected to reordering.

In some embodiments of the present disclosure, since the receiver obtains the sequential identifier of each SDU included in each PDU, the receiver can perform ordering on the data segments according to the sequential identifier of the SDU obtained from the PDU. The entire SDU is obtained through ordering and restoring and is extracted out.

The contents described in the above steps 309 and 310 are as below: if the specific field of the PDU is the second value, the receiver continuously receives the PDU according to the SN field of the PDU till all the PDUs with the same SN field are received. Reordering is performed on all the PDUs. The SDU is extracted from all the PDUs subjected to reordering.

It should be noted that the above described SDU transmission process may be applied to an RLC UM. When a PDU is transmitted through the PDCP layer in the UM, the only requirement is to directly transmit the SDU to the upper layer of the PDCP layer without adding the SN field to the SDU. The upper layer of the PDCP layer may be an IP (Internet Protocol) layer, which will not be specifically limited in the present disclosure.

In the data unit transmission method provided by some embodiments of the present disclosure, the value of the specific field of the PDU is set to be the first value to indicate that the current PDU includes an entire SDU; the value of the specific field of the PDU is set to be the second value to indicate that the current PDU includes a data segment of the SDU; a SN field is added into the PDU that includes a data segment of the SDU, and no SN field is added into the PDU that includes the entire SDU. Thus, a reordering may be performed only on the PDU that includes the data segment of the SDU according to the SN field, and no reordering is performed on the PDU that includes the entire SDU. Hence, time delays in receiving and processing the PDU are reduced. The processing efficiency is improved accordingly.

Figure 4:
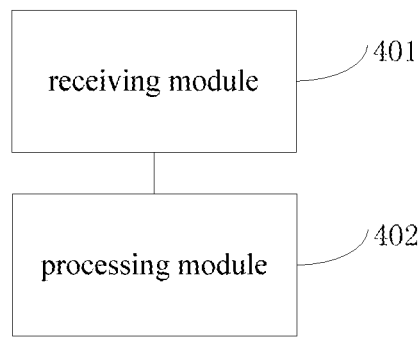
FIG. 4 illustrates a block diagram of a data unit transmission device according to some embodiments of the present disclosure.

FIG. 4 is a block diagram showing a data unit transmission device according to some embodiments of the present disclosure. Referring to FIG. 4, the data unit transmission device includes a receiving module 401 and a processing module 402.

The various device components, units, blocks, or portions may have modular configurations, or are composed of discrete components, but nonetheless can be referred to as "modules" in general. In other words, the "components," "modules" or "units" referred to herein may or may not be in modular forms.

The receiving module 401 is configured to receive a configuration instruction for a data bearer from a base station.

The processing module 402 is configured to add a SN (Serial Number) field to a PDU (Packet Data Units) header of the data bearer if the PDU includes a data segment of SDU in an RLC UM, and no SN (Serial Number) field is added PDU header in the of the data bearer if the PDU includes an entire SDU in an RLC (Radio Link Control) UM (unacknowledged mode), after receiving the configuration instruction.

In some implementations, the configuration instruction is configured to instruct that a ROHC (Robust Header Compression) of the data bearer which is set to the RLC UM is turned off.

In some implementations, the configuration instruction is configured to indicate that a duplicate detection of a data bearer which is set to the RLC UM is turned off.

In some implementations, the data unit transmission device further includes:

a transmission module configured to transmit an SDU without adding a SN field through a PDCP layer in a specific mode.

Figure 5A:
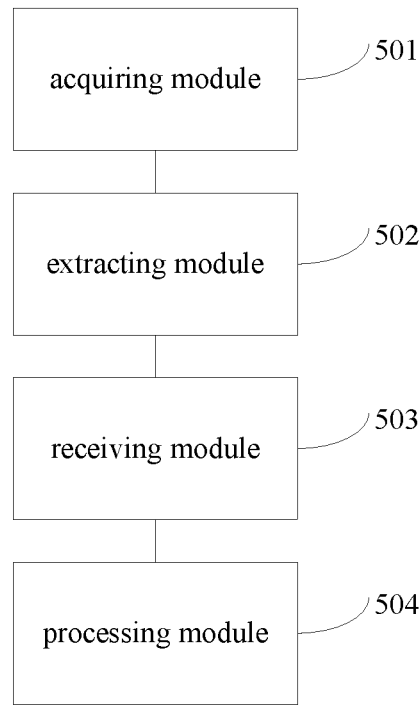
FIG. 5A illustrates a block diagram of a data unit transmission device according to some embodiments of the present disclosure.

FIG. 5A is a block diagram showing a data unit transmission device according to some embodiments of the present disclosure. Referring to FIG. 5A, the data unit transmission device includes an acquiring module 501, an extracting module 502, a receiving module 503 and a processing module 504.

The acquiring module 501 is configured to acquire a specific field of a PDU, the specific field is configured to indicate whether data included in the PDU is a data segment.

The extracting module 502 is configured to extract an SDU from the PDU by the RLC layer if the specific field is a first value. The first value is configured to indicate that the PDU includes an entire SDU.

The receiving module 503 is configured to continuously receive the PDU by the RLC layer according to an SN field of the PDU if the specific field is a second value.

The processing module 504 is configured to perform reordering on all the PDUs till all the PDUs of which SN fields are identical to the SN field.

The extracting module 502 is configured to extract an SDU from all the PDUs subjected to reordering. The second value is configured to indicate that the PDU comprises a data segment of the SDU.

According to the data unit transmission device provided by some embodiments of the present disclosure, a data compression function is started by receiving the configuration instruction for the data bearer, issued by the base station, such that after the data compression function is started, the SN field is added into the PDU that includes the data segment of the SDU, and no SN field is added to the PDU that includes the entire SDU but. Thus, a reordering is performed only on the PDU that includes the data segment of the SDU according to the SN field, and no reordering is performed only on the PDU that includes the entire SDU. Hence, time delays in receiving and processing the PDU are reduced. The processing efficiency is improved accordingly.

Figure 5B:
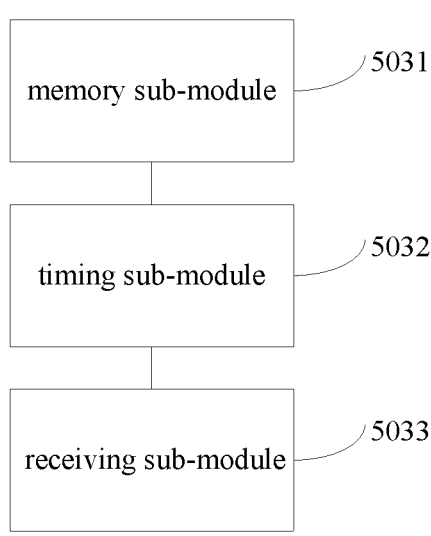
FIG. 5B illustrates a block diagram of a data unit transmission device according to some embodiments of the present disclosure.

In some embodiments, referring to FIG. 5B, the receiving module 503 includes a memory sub-module 503, a timing sub-module 5032 and a receiving sub-module 5033.

The memory sub-module 5031 is configured to store a PDU in a cache by an RLC layer.

The timing sub-module 5032 is configured to set one timer that corresponds to an SN field for the SN field by the RLC layer and to start the timer.

The receiving sub-module 5033 is configured to continuously receive, by the RLC layer, other PDUs of which SN fields are consistent with the SN field.

The memory sub-module 5031 is further configured to store the other PDUs in the cache.

Figure 5C:
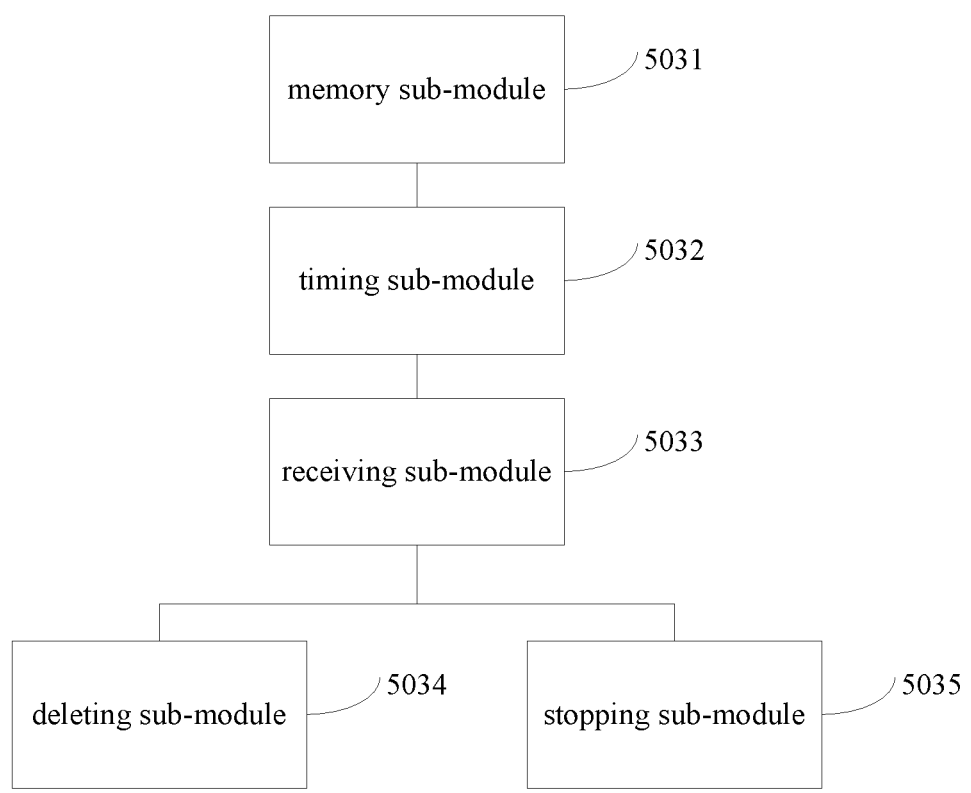
FIG. 5C illustrates a block diagram of a data unit transmission device according to some embodiments of the present disclosure.

In some embodiments, referring to FIG. 5C, the receiving module 503 further includes a deleting sub-module 5034 and a stopping sub-module 5035.

The deleting sub-module 5034 is configured to delete, by the RLC layer, the PDUs and the other PDUs if a timing period of the timer exceeds a preset time period.

The stopping sub-module 5035 is configured to, when all the PDUs with the same SN fields are received, stop the timer corresponding to the SN field by the RLC layer if the timing period of the timer is shorter than the preset time period.

Figure 5D:
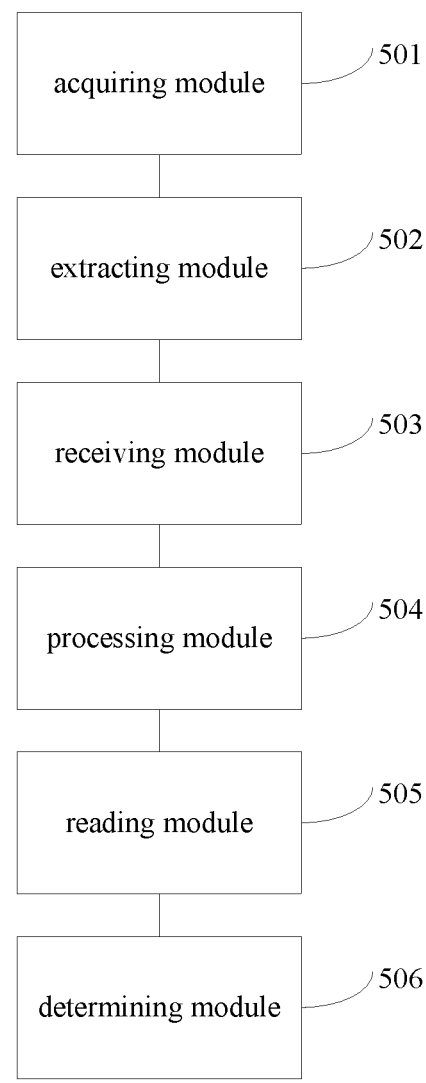
FIG. 5D illustrates a block diagram of a data unit transmission device according to some embodiments of the present disclosure.

In some embodiments, referring to FIG. 5D, the data unit transmission device further includes a reading module 505 and a determining module 506.

The reading module 505 is configured to obtain a sequential identifier from the received PDU. The sequential identifier is configured to indicate a sequential position of a data segment, which is included in a current PDU, in the SDU.

The determining module 506 is configured to, when the obtained sequential identifier indicates that the data segment of the SDU comprised by the current PDU is the last data segment in the SDU, determine by the RLC layer that all the PDUs with the same SN field are currently received.

In some embodiments, the processing module 504 is further configured to perform, by the RLC layer, a reordering on all the PDUs based on the sequential identifier of each received PDU.

In the above devices according to the embodiments, specific implementing manners of all the modules have been described in the examples of the related methods, which will not be described repeatedly herein.

Figure 6:
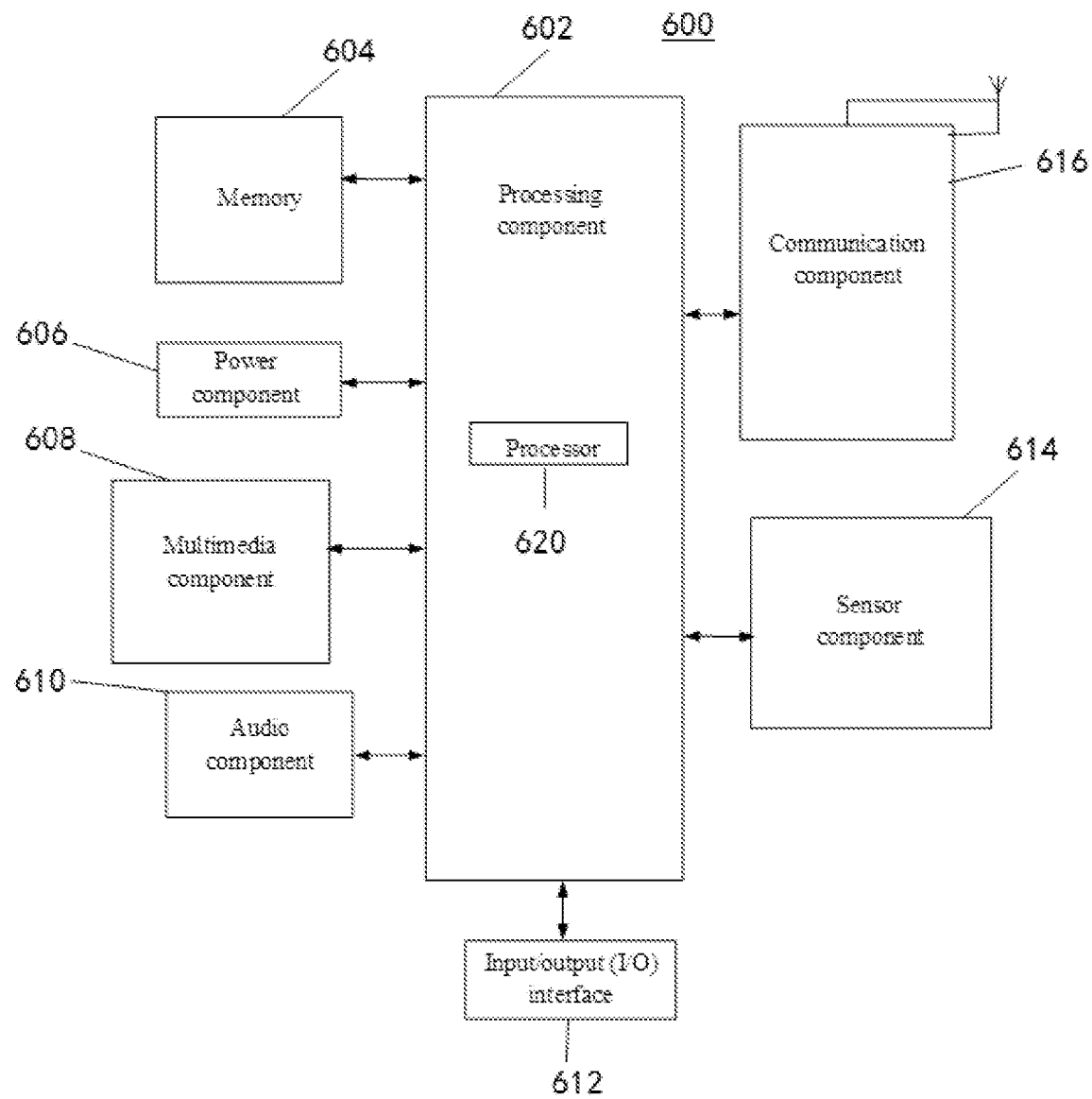
FIG. 6 illustrates a block diagram of a data unit transmission device according to some embodiments of the present disclosure.

FIG. 6 is a block diagram showing a data unit transmission device 600 according to some embodiments of the present disclosure. For example, the device 600 may be a mobile phone, a computer, a digital broadcast terminal, a message transceiver device, a game console, a tablet device, a medical equipment, a fitness equipment, a personal digital assistant, or the like.

Referring to FIG. 6, the device 600 may include one or more of the following components: a processing component 602, a memory 604, a power component 606, a multimedia component 608, an audio component 610, an I/O (input/output) interface 612, a sensor component 614, and a communication component 616.

The processing component 602 typically controls overall operations of the device 600, such as the operations associated with display, telephone calls, data communications, camera operations, and recording operations. The processing component 602 may include one or more processors 820 to execute instructions to perform all or part of the steps in the above described methods. Moreover, the processing component 602 may include one or more modules which facilitate the interaction between the processing component 602 and other components. For instance, the processing component 602 may include a multimedia module to facilitate the interaction between the multimedia component 608 and the processing component 602.

The memory 604 is configured to store various types of data to support the operation of the device 600. Examples of such data include instructions for any applications or methods operated on the device 600, contact data, phonebook data, messages, pictures, video, etc. The memory 604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the device 600. The power component 606 may include a power management system, one or more power sources, and any other components associated with the generation, management, and distribution of power in the device 600.

The multimedia component 608 includes a screen providing an output interface between the device 600 and the user. In some examples, the screen may include a liquid-crystal display (LCD) and a touch panel (TP). In some embodiments, the screen can be other types of displays, such as organic light-emitting diode (OLED) displays.

If the screen includes the touch panel, the screen may be implemented as a touch screen to receive input signals from the user. The touch panel includes one or more touch sensors to sense touches, slips, and gestures on the touch panel. The touch sensors may not only sense a boundary of a touch or slip action, but also sense a period of time and a pressure associated with the touch or slip action. In some examples, the multimedia component 608 includes a front camera and/or a rear camera. The front camera and the rear camera may receive an external multimedia datum while the device 600 is in an operation mode, such as a photographing mode or a video mode. Each of the front camera and the rear camera may be a fixed optical lens system or have focus and optical zoom capability.

The audio component 610 is configured to output and/or input audio signals. For example, the audio component 610 includes a microphone ("MIC") configured to receive an external audio signal when the device 600 is in an operation mode, such as a call mode, a recording mode, and a voice recognition mode. The received audio signal may be further stored in the memory 604 or transmitted via the communication component 616. In some examples, the audio component 610 further includes a speaker to output audio signals.

The I/O interface 612 provides an interface between the processing component 602 and peripheral interface modules, such as a keyboard, a click wheel, buttons, and the like. The buttons may include, but are not limited to, a home button, a volume button, a starting button, and a locking button.

The sensor component 614 includes one or more sensors to provide status assessments of various aspects of the device 600. For instance, the sensor component 614 may detect an open/closed status of the device 600, relative positioning of components, e.g., the display and the keypad, of the device 600, a change in position of the device 600 or a component of the device 600, a presence or absence of user contact with the device 600, an orientation or an acceleration/deceleration of the device 600, and a change in temperature of the device 600. The sensor component 614 may include a proximity sensor configured to detect the presence of nearby objects without any physical contact. The sensor component 614 may also include a light sensor, such as a CMOS or CCD image sensor, for use in imaging applications. In some examples, the sensor component 614 may also include an accelerometer sensor, a gyroscope sensor, a magnetic sensor, a pressure sensor, or a temperature sensor.

The communication component 616 is configured to facilitate communication, wired or wirelessly, between the device 600 and other devices. The device 600 can access a wireless network based on a communication standard, such as Wi-Fi, 2G, 3G, 4G, or 5G, or a combination thereof. In some examples, the communication component 616 receives a broadcast signal or broadcast associated information from an external broadcast management system via a broadcast channel. In some examples, the communication component 616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some examples, the device 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described data unit transmission methods.

In some embodiments, there is also provided a non-transitory computer-readable storage medium including instructions, such as included in the memory 604, executable by the processor 620 in the device 600, for performing the above-described methods. For example, the non-transitory computer-readable storage medium may be a ROM, a RAM, a CD-ROM, a magnetic tape, a floppy disc, an optical data storage device, and the like.

When the instructions in the storage medium are executed by a processor of a data unit transmission device, the data unit transmission device is enabled to perform the above described data unit transmission methods.

Variations of the methods and devices described above are covered by the present disclosure. For example, a data unit transmission method can include:

receiving a configuration instruction for a data bearer from a base station; and after receiving the configuration instruction, obtaining a PDU of data bearer without adding a SN (Serial Number) field to a header of the PDU if the PDU comprises an entire SDU (Service Data Unit) in an RLC (Radio Link Control) UM (Unacknowledged Mode), or obtaining a PDU of data bearer with adding a SN (Serial Number) field to a header of the PDU if the PDU comprises a data segment of an entire SDU in an RLC UM.

In some embodiments, the configuration instruction is configured to instruct to turn off an ROHC (Robust Header Compression) function of a data bearer adopting the RLC UM.

In some embodiments, the configuration instruction is configured to instruct to turn off a duplicate detection function of a data bearer adopting the RLC UM.

In some embodiments, the method further includes:

obtaining a PDU of data bearer without adding a SN field to a header of the PDU, if the PDU is transmitted through a PDCP (Packet Data Convergence Protocol) layer in a specific mode.

In another aspect, there is provided a data unit transmission method, comprising:

acquiring, by an RLC layer, a specific field of a PDU, wherein the specific field is configured to indicate whether the PDU comprises a data segment;

extracting, by the RLC layer, an SDU from the PDU if the specific field has a first value, wherein the first value is configured to indicate that the PDU comprises an entire SDU; or continuously receiving, by the RLC layer, a following PDU according an SN field of a PDU if the specific field has a second value; then performing a reordering when all the PDUs with the same SN field are received, and extracting an SDU from the recorded PDUs, wherein the second value is configured to indicate that the PDU comprises a data segment of the SDU.

In some embodiments, the continuously receiving a following PDU according an SN field of a PDU comprises:

storing, by the RLC layer, the PDUs in a cache;

setting, by the RLC layer, one timer that corresponds to the SN field for the SN field and starting the timer; and continuously receiving, by the RLC layer, a PDU with the same SN field, and storing all the PDUs in the cache.

In some embodiments, the method further comprises:

deleting, by the RLC layer, all the PDUs with the same SN field if a timing period of the timer exceeds a preset time period; and when all the PDUs with the same SN field are received within a timing period shorter than the preset time period, stopping, by the RLC layer, the timer corresponding to the SN field.

In some embodiments, the method further comprises:

obtaining, by the RLC layer, a sequential identifier of each received PDU, wherein the sequential identifier is configured to indicate a sequential position of a data segment in the SDU; and when the sequential identifier indicates that a data segment of the SDU comprised by a PDU is a last segment in the SDU, determining, by the RLC layer, that all the PDUs with the same SN field are received.

In some embodiments, the performing a reordering when all the PDUs with the same SN field are received comprises:

performing, by the RLC layer, a reordering on all the PDUs based on a sequential identifier of each received PDU when all the PDUs with the same SN field are received.

In another aspect of the present disclosure, there is provided a data unit transmission device, comprising:

a receiving module configured to a configuration instruction for a data bearer from a base station; and a processing module configured to, after receiving the configuration instruction, obtain a PDU of data bearer without adding a SN (Serial Number) field to a header of the PDU if the PDU comprises an entire SDU (Service Data Unit) in an RLC (Radio Link Control) UM (Unacknowledged Mode), or obtain a PDU of data bearer with adding a SN (Serial Number) field to a header of the PDU if the PDU comprises a data segment of an entire SDU in an RLC UM.

In some embodiments, the configuration instruction is configured to instruct to turn off an ROHC (Robust Header Compression) function of a data bearer adopting the RLC UM.

In some embodiments, the configuration instruction is configured to instruct to turn off a duplicate detection function of a data bearer adopting the RLC UM.

In some embodiments, the device further comprises:

a transmission module configured to obtain a PDU of data bearer without adding a SN field to a header of the PDU, if the PDU is transmitted through a PDCP (Packet Data Convergence Protocol) layer in a specific mode.

In another aspect, there is provided a data unit transmission device, comprising:

an acquiring module configured to acquire, by an RLC layer, a specific field of a PDU, wherein the specific field is configured to indicate whether the PDU comprises a data segment;

an extracting module configured to extract, by the RLC layer, an SDU from the PDU if the specific field has a first value, wherein the first value is configured to indicate that the PDU comprises an entire SDU;

a receiving module configured to continuously receive a following PDU according an SN field of a PDU if the specific field has a second value, wherein the second value is configured to indicate that the PDU comprises a data segment of the SDU;

a processing module configured to perform a reordering when all the PDUs with the same SN field are received; and an extracting module configured to extract an SDU from the recorded PDUs.

In some embodiments, the receiving module comprises:

a memory sub-module configured to store, by the RLC layer, the PDUs in a cache;

a timing sub-module configured to set, by the RLC layer, one timer that corresponds to the SN field for the SN field and starting the timer; and a receiving sub-module configured to receive, by the RLC layer, a PDU with the same SN field, wherein the memory sub-module is configured to store the received PDUs in the cache.

In some embodiments, the receiving module further comprises:

a deleting sub-module configured to delete, by the RLC layer, all the PDUs with the same SN field if a timing period of the timer exceeds a preset time period; and a stopping sub-module configured to stop, by the RLC layer, the timer corresponding to the SN field, when all the PDUs with the same SN field are received within a timing period shorter than the preset time period.

In some embodiments, the device further comprises:

a reading module configured to obtain, by the RLC layer, a sequential identifier of each received PDU, wherein the sequential identifier is configured to indicate a sequential position of a data segment in the SDU; and a determining module configured to determine, by the RLC layer, that all the PDUs with the same SN field are received, when the sequential identifier indicates that a data segment of the SDU comprised by a PDU is a last segment in the SDU.

In some embodiments, wherein the processing module is further configured to perform, by the RLC layer, a reordering on all the PDUs based on a sequential identifier of each received PDU when all the PDUs with the same SN field are received.

In another aspect of the present disclosure, there is provided a data unit transmission device, comprising:

a processor; and a memory configured to store an executable instruction of the processor, wherein the processor is configured to:

receive a configuration instruction for a data bearer from a base station; and after receiving the configuration instruction, obtain a PDU of data bearer without adding a SN (Serial Number) field to a header of the PDU if the PDU comprises an entire SDU (Service Data Unit) in an RLC (Radio Link Control) UM (Unacknowledged Mode), or obtain a PDU of data bearer with adding a SN (Serial Number) field to a header of the PDU if the PDU comprises a data segment of an entire SDU in an RLC UM.

In another aspect of the present disclosure, there is provided a data unit transmission device, comprising:

a processor; and a memory configured to store an executable instruction of the processor, wherein the processor is configured to:

acquire, by an RLC layer, a specific field of a PDU, wherein the specific field is configured to indicate whether the PDU comprises a data segment;

extract, by the RLC layer, an SDU from the PDU if the specific field has a first value, wherein the first value is configured to indicate that the PDU comprises an entire SDU; or continuously receive, by the RLC layer, a following PDU according an SN field of a PDU if the specific field has a second value; then perform a reordering when all the PDUs with the same SN field are received, and extracting an SDU from the recorded PDUs, wherein the second value is configured to indicate that the PDU comprises a data segment of the SDU.

In the present disclosure, it is to be understood that the terms "lower," "upper," "front," "left," "top," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on," a second element may indicate direct contact between the first and second elements, without contact, or indirect through an intermediate medium, unless otherwise explicitly stated and defined.

In the description of the present disclosure, the terms "some embodiments," "example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a Read-Only Memory (ROM), a Random-Access Memory (RAM), a Compact Disc Read-Only Memory (CD-ROM), a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them.

Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A data unit transmission method, comprising:
   determining data to be transmitted by a PDU (Packet Data Unit) of a data bearer;
   determining whether the data to be transmitted is an entire SDU (Service Data Unit) in an RLC (Radio Link Control) UM (Unacknowledged Mode) or a data segment of the SDU in the RLC UM; if the data is a data segment of the SDU, obtaining the PDU of the data bearer and adding an SN (Serial Number) field, indicating that the data correspond to a header of the PDU, and
   receiving a configuration instruction for the data bearer, wherein the configuration instruction is configured to instruct to turn off an ROHC (Robust Header Compression) function of a data bearer in the RLC UM.

2. The data unit transmission method according to claim 1, further comprising:
   obtaining the PDU of the data bearer without adding the SN field to a header of the PDU if the data to be transmitted by the PDU is the entire SDU in the RLC UM.

3. The data unit transmission method according to claim 1, further comprising:
   receiving a configuration instruction for the data bearer, wherein the configuration instruction is configured to instruct to turn off a duplicate detection function of a data bearer in the RLC UM.

4. The data unit transmission method according to claim 1, further comprising:
   obtaining the PDU of the data bearer without adding the SN field to a header of the PDU, if the PDU is transmitted through a PDCP (Packet Data Convergence Protocol) layer in a specific mode.

5. A data unit transmission device comprising:
a processor; and
a memory configured to store an executable instruction of the processor, wherein the processor is configured to:
determine data to be transmitted by a PDU (Packet Data Unit) of a data bearer;
determine whether the data to be transmitted is an entire SDU (Service Data Unit) in an RLC (Radio Link Control) UM (Unacknowledged Mode) or a data segment of the SDU in the RLC UM; if the data is a data segment of the SDU, obtaining a PDU of the data bearer with adding a SN (Serial Number) field, indicating that the data correspond to a header of the PDU, and
receive a configuration instruction for the data bearer, wherein the configuration instruction is configured to instruct to turn off an ROHC (Robust Header Compression) function of the data bearer in the RLC UM.

6. The data unit transmission device of claim 5, wherein the processor is configured to:
obtain a PDU of the data bearer without adding a SN field to a header of the PDU if the data to be transmitted by the PDU is an entire SDU in an RLC UM.

7. The data unit transmission device of claim 5, wherein the processor is configured to:
receive a configuration instruction for the data bearer, wherein the configuration instruction is configured to instruct to turn off a duplicate detection function of the data bearer in the RLC UM.

8. The data unit transmission device of claim 5, wherein the processor is configured to:
obtain a PDU of the data bearer without adding a SN field to PDU header, if the PDU is transmitted through a PDCP (Packet Data Convergence Protocol) layer in a specific mode.

9. A data unit transmission device comprising:
a processor; and
a memory configured to store executable instructions for the processor, wherein the processor is configured to:
obtain a specific field of a PDU (Packet Data Unit), wherein the specific field is configured to indicate whether the PDU comprises a data segment of an SDU (Service Data Unit);
if the specific field indicates that the PDU comprises an entire SDU, obtain the SDU from the PDU;
if the specific field indicates that the PDU comprises a data segment of an SDU, continuously receive PDUs until all the PDUs with the same SN (Serial Number) field are received; and reordering all the PDUs with the same SN field to obtain an entire SDU, and
receive a configuration instruction for a data bearer, wherein the configuration instruction is configured to instruct to turn off an ROHC (Robust Header Compression) function of the data bearer in the RLC UM.

10. The data unit transmission device according to claim 9, wherein the continuously receiving PDUs until all the PDUs with the same SN field are received comprises:
if all the PDUs with the same SN field are not received within a preset time period, delete all received PDUs with the same SN field; and
send a re-transmission request.

11. The data unit transmission device according to claim 9, wherein the continuously receive PDUs until all the PDUs with the same SN field are received comprises:
set a timer corresponding to the SN field;
if all the PDUs with the same SN field are not received within a preset time period of the timer, deleting all received PDUs with the same SN field; and
if all the PDUs with the same SN field are received within a preset time period of the timer, resetting the timer.

12. The data unit transmission device according to claim 9, wherein until all the PDUs with the same SN field are received, the processor is further configured to:
obtain a sequential identifier of each received PDU, wherein the sequential identifier is configured to indicate a sequential position of a data segment in the SDU;
determine that all the PDUs with the same SN field are received when a data segment with a sequential identifier corresponding to a last sequential position in the SDU is received.

13. The data unit transmission device according to claim 12, wherein the reorder all the PDUs with the same SN field to obtain an entire SDU comprises:
reorder all the PDUs with the same SN field according to the sequential identifier to obtain the SDU.

* * * * *